United States Patent [19]

Heaton et al.

[11] 3,888,145
[45] June 10, 1975

[54] METHOD AND APPARATUS FOR REMOVING TREAD MATERIAL FROM VEHICLE TIRES

[75] Inventors: James W. Heaton, Greensburg; William E. Fawcett, Latrobe, both of Pa.

[73] Assignee: Kennametal Inc., Latrobe, Pa.

[22] Filed: May 17, 1974

[21] Appl. No.: 471,050

Related U.S. Application Data

[63] Continuation of Ser. No. 379,372, July 16, 1973.

[52] U.S. Cl. ............... 82/1 C; 29/105 R; 157/13
[51] Int. Cl. ............... B23b 3/00; B26d 1/12
[58] Field of Search ...... 29/105, 105 A, 78; 82/1 R, 82/1 C; 57/13

[56] References Cited
UNITED STATES PATENTS

| | | | |
|---|---|---|---|
| 2,645,003 | 7/1953 | Thompson et al. | 29/105 R |
| 2,664,617 | 1/1954 | Kralowetz | 29/105 R |
| 3,426,828 | 2/1969 | Neilsen | 157/13 |
| 3,604,084 | 9/1971 | Krieger et al. | 29/78 |
| 3,614,973 | 10/1971 | Jensen et al. | 157/13 |
| 3,646,984 | 3/1972 | Morgan et al. | 157/13 |

Primary Examiner—Harrison L. Hinson
Attorney, Agent, or Firm—Melvin A. Crosby

[57] ABSTRACT

A method and apparatus for removing tread material from vehicle tires preparatory to retreading the tire in which a rotary cutter rotating on an axis generally coplanar with the axis of rotation of the tire has sharp cutting elements therein which cut chips from the tread of the tire when the cutter and tire rotate relatively. The sharp cutting elements are formed of a hard wear resistant material such as cemented hard carbides and are detachably supported in a cutter body for ease of replacement therein and also so as to be indexable relative to the cutter body. The cutting elements, or inserts, have a high positive rake angle and the peripheries thereof are inclined at an angle slightly greater than the positive rake angle.

5 Claims, 6 Drawing Figures

3,888,145

METHOD AND APPARATUS FOR REMOVING TREAD MATERIAL FROM VEHICLE TIRES

RELATED APPLICATION:

James W. Heaton and William E. Fawcett U.S. application Ser. No. 379,372, filed July 16, 1973, for APPARATUS FOR REMOVING TREAD MATERIAL FROM VEHICLE TIRES.

The present invention relates to the removing of tread material from a vehicle tire preparatory to the retreading of the vehicle tire and is particularly concerned with a method of removing the tread material and to a cutting device which effects the removal of the tread material from the tire.

This application is a continuation-in-part of Ser. No. 379,372, filed July 16, 1973, entitled "Apparatus for Removing Tread Material From Vehicle Tires."

The removing of tread material from pneumatic vehicle tires is a well known procedure and is generally accomplished by abrading the periphery of the tire with an abrading element which may be in the form of a barbed rasp, or a moving member having coarse abrasive thereon. It has also been attempted to remove the tread material by cutting with a sharp knife.

The defect with the first mentioned system is that considerable heat is generated which results in the development of dust and smoke and vapors while, furthermore, the tread material is removed in such a manner that a great deal of it is in extremely fine form, thus, creating a dusty condition which can be hazardous to the health and which can form a fire hazard and which, furthermore, requires the installation of rather expensive dust collecting equipment.

In the second mentioned method in which a sharp knife is employed for removing the tread material, a great deal of force is required to turn the tire against the cutting blade and foreign material imbedded in the tread material can severely damage such knives. Furthermore, this procedure for removing the tread material from a vehicle tire is not as rapid as the removal of the tread material by an abrasive device.

Having the foregoing in mind, a primary objective of the present invention is the provision of a method and apparatus for removing tread material from a vehicle tire preparatory to retreading the tire which is rapid and efficient.

Another object is the provision of a method and apparatus of the nature referred to in which there is substantially no dust or smoke developed during the removing of the material from the tire tread.

Still another object is the provision of a method and apparatus for removing tread material from a vehicle tire preparatory to recapping the tire which eliminates the need for expensive dust separators and which also reduces health and fire hazards that usually go with such an operation.

Still another object is the provision of a cutting device for cutting tread rubber from a vehicle tire preparatory to recapping the tire in which replaceable indexable cutting elements are employed.

These and other objects and advantages of the present invention will become more apparent upon reference to the following detailed specification taken in connection with the accompanying drawings in which.

BRIEF SUMMARY OF THE INVENTION

According to the present invention, a spindle is provided on which a vehicle tire is mounted and inflated so that the vehicle tire can be rotated on its axis while the tread portion thereof is firmly supported. Arranged in radially spaced relation to the tire and moveable radially toward and away from the tire is a cutting device in the form of a disc-like body having detachably mounted therein in circumferentially distributed relation a plurality of sharp edged cutting elements, or inserts.

The cutting elements are individually replaceable and are individually indexable on the cutter body. The support for the cutter is also rotatable about a vertical axis disposed near the region of the tread of the tire which is engaged by the cutter so that the cutter can be caused to follow a curved path across the tire tread thereby imparting the desired shape thereto for receiving recapping material.

DETAILED DESCRIPTION OF THE INVENTION

Figure 1:
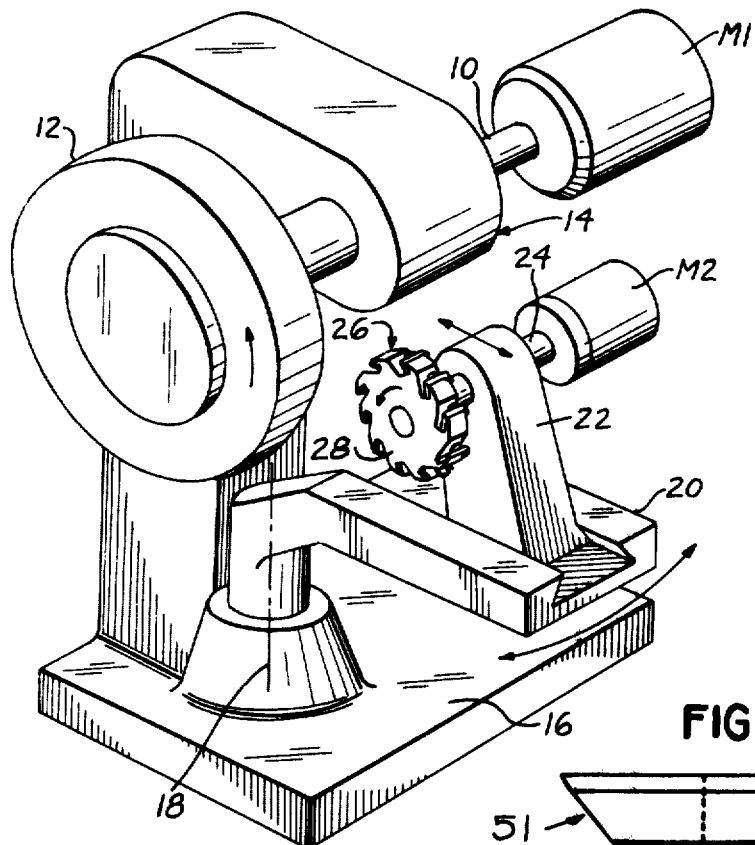
FIG. 1 is a view illustrating diagrammatically a machine for use in removing tread material from a vehicle tire.

Referring to the drawings somewhat more in detail, in FIG. 1, reference numeral 10 represents a spindle adapted for being driven in rotation by a motor M1 and having means for supporting a tire 12 which may be a conventional pneumatic vehicle tire. Tire 12 is a tire which is to be supplied with new tread material by known recapping techniques and preparatory to having the new tread material applied thereto, the old, worn tread material is cut away to present a clean outwardly facing surface to which the new tread material is caused to adhere by a vulcanization process.

The spindle 10 may be fixedly supported in any suitable machine frame generally designated 14. The machine frame comprises a foot portion 16 fixedly arranged relative to the portion supporting spindle 10 and having means defining a vertical pivot axis 18. Vertical pivot axis 18 extends vertically in the region of the central radial plane of tire 12 and somewhat radially inwardly from the outer periphery of tire 12.

Pivotally mounted on foot 16 so as to be swingable about axis 18 is an arm 20 on which there is slidably mounted a support 22. Support 22 is slidable radially toward and away from pivot axis 18 and, therefore, radially toward and away from tire 12. Support 22 carries a spindle 24 drivingly connected to a motor M2 and mounted on spindle 24 is a cutter generally indicated at 26 which has distributed about the periphery sharp edged cutting elements.

When cutter 26 is driven in the direction of the arrow thereon and brought into engagement with the periphery of tire 12 when the tire is rotating in the direction of the arrow on the tire, the cutting inserts in the cutter will cut chips from the tire tread and in this manner remove the desired amount of the worn tire tread.

By swinging arm 20 about axis 18, the cutting of the tread can be caused to proceed over as much of the worn tread area as it is desired to remove. The cutting of the worn tread from the tire can be accomplished in a single pass across the tire tread or in multiple passes. The support may be cam controlled to produce the desired contour on the tire being worked.

Figure 2:
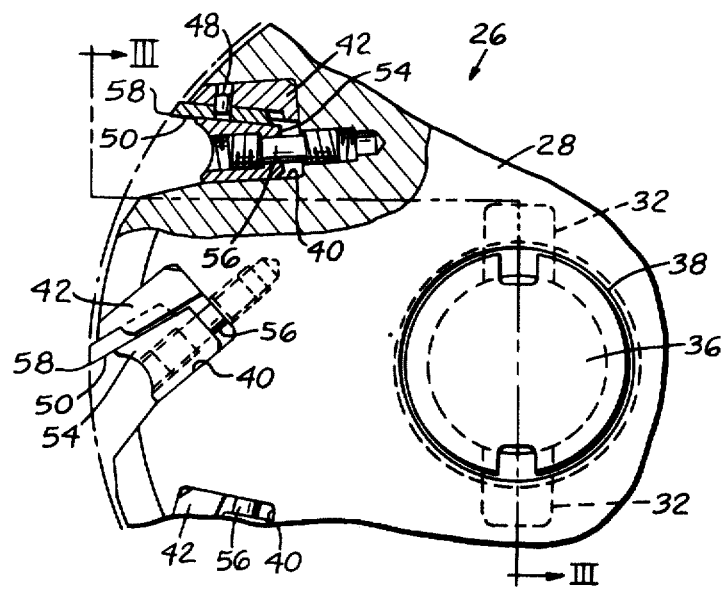
FIG. 2 is a side view broken away and drawn at somewhat enlarged scale showing the cutting device used in the machine of FIG. 1.
Figure 3:
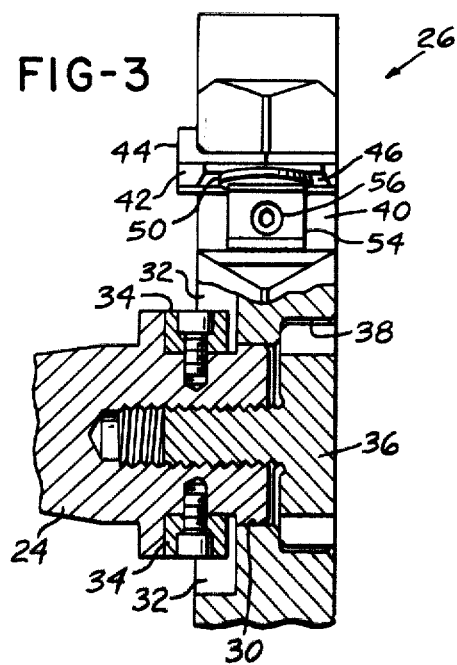
FIG. 3 is a section indicated on line III—III of FIG. 2.

A particular point of novelty in respect of the device illustrated in FIG. 1 is to be found in the cutter 26 which, as will be seen in FIGS. 2 and 3, comprises a body 28 having a central aperture 30 for receiving spindle 24. On the side of body 28 facing the spindle, the body is formed with notches 32 which receive keys 34 fixed to spindle 24. The body is clamped to the spindle by a large screw 36 threaded into the spindle and having a head engaging the bottom of recess 38 formed in the side of the cutter body facing away from the spindle.

The cutter body, as will best be seen in FIG. 2, has a plurality of pockets or recesses 40 formed therein extending inwardly from the periphery of the cutter body in uniformly distributed circumferential relation and each inclined in the same direction relative to the radial direction of the body.

Each pocket or recess is adapted for receiving a nest member 42 which has a leg 44 at one side for engaging the adjacent side of the cutter body 28. When a nest member 42 is inserted into a pocket until it abuts the bottom wall of the pocket, and so that the leg 44 abuts one side of the cutter body, the respective nest element will be precisely located in its pocket.

Each nest element has a recess 46 formed therein and also has a pin 48 extending into the recess. The recess is slightly more shallow in the direction of the axis of pin 48 than the thickness of a cutting insert 50 adapted for being received in the recess and the recess is likewise larger in the radial direction of pin 48 than insert 50. The insert has a central hole 52 which receives pin 48, and in this manner, the insert is located in the recess and is likewise prevented from shifting therein.

As will be seen in FIG. 2, the one side of nest element 42 engages one side of pocket 40 and the bottom wall of recess 46 which is formed in the opposite side of the nest member, diverges in the radially outward direction with the opposite side of the nest member. The top face of an insert 50 in the recess also diverges from the opposed side wall of the pocket in the outward direction.

Because of this, the cutting insert and nest member can be firmly clamped in position by utilizing a simple wedge 54, the opposite sides of which taper so that when one side of the wedge engages the adjacent side of a pocket 40, the opposite side of the wedge engages the exposed top surface of the adjacent cutting insert 50.

The wedge 54 is adapted for being firmly drawn into pocket 40 to effect the aforementioned wedging action by a screw 56 which has the opposite ends threaded in respectively opposite directions with the radially outer threaded end threadedly engaging a hole in the wedge and the other threaded end threadedly engaging a threaded hole in the cutter body which extends in a direction parallel to the wall of the pocket 40 and on which the wedge slides.

Each cutting element, or insert, 50 is formed of a hard wear resistant material such as a good grade of tool steel or, preferably, a cemented hard metal carbide material such as tungsten or titanium carbide or mixtures thereof. Other hard metal carbides can be included in the composition without in any way detracting from the utility of the inserts.

Figure 4:
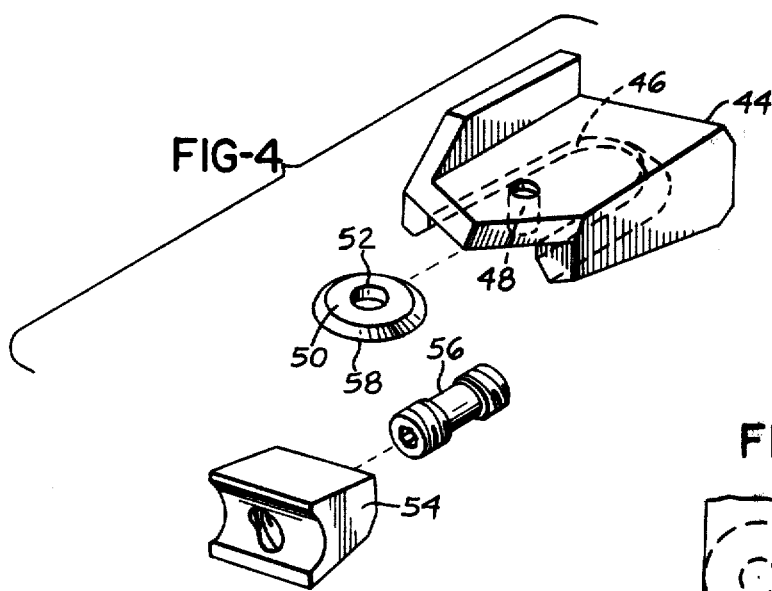
FIG. 4 is an exploded perspective view showing a cutting insert employed with the cutting device of FIGS. 2 and 3 and showing the supporting nest therefor and the clamp member which clamps the insert in the nest while simultaneously clamping the nest in a recess provided therefor in the cutter body.

As will best be seen in FIG. 4, each cutting element, or insert, 50 is circular, has parallel top and bottom faces and a peripheral wall. Each cutting element, or insert, can be indexed about the axis of the respective pin 48 so that when one peripheral portion of the element or insert becomes worn, a new portion can be brought into cutting position. It will also be noted that the cutting element, or insert, has a relatively sharp edge 58 extending thereabout at the juncture of the peripheral wall with the top face with the included angle formed between the peripheral wall and the top face ranging from about 85° down to about 30°.

The included angle formed at the cutting edge is determined by the angle which the cutting element makes with the peripheral surface of the cutter body adjacent thereto because the radially outer side of the periphery of the cutting element must be inclined at such an angle as to provide for clearance from the tread material being cut.

As illustrated in FIG. 2, each cutting element has an angle of about 45° at the cutting edge and is inclined at an angle of about 30° to the radius so that the clearance angle at the radially outer side of the element is on the order of about 15°.

Figure 6:
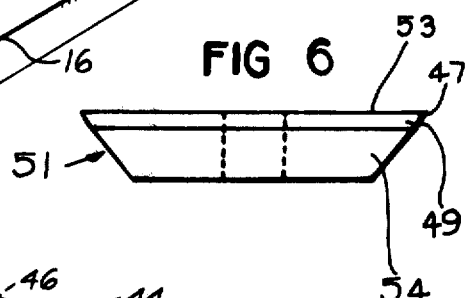
FIG. 6 shows a modified type of cutting element or insert for use in the practice of the invention.

The insert of FIG. 6 has the cutting edge 47 reinforced by an axial portion 49 of peripheral wall 51 which makes a larger included angle with the plane of top face 53 than does the axial portion 54 of the peripheral wall. Portion 49, for example, may make an angle of about 2° to 5° less than the complement of the rake angle of the insert while portion 54 makes a smaller angle with the plane of top face 53, up to 45°, for example.

The cutter body may vary considerably in size and might be as small as 6 inches or as large as 11½ inches in diameter. The number of cutting elements mounted in the cutters can vary from about 8 to about 12. When the cutter is rotating on an axis parallel to that of the tire, the smaller number of cutters is employed because, under these conditions, the maximum relative speed is obtained between the tread surface and the cutting elements in the cutter body.

When the tread is removed by the cutter rotating on an axis generally perpendicular to the tire axis, a greater number of cutting elements are mounted in the cutter body. In both instances, the cutting elements are enabled to take cleanly cut chips of substantial size from the tread material.

Each element might have a major diameter of about ¾ to 1 inch and be on the order of about ⅛ inch thick.

The particular cutting element illustrated in the drawings is circular, but it will be understood that the element could be polygonal when viewed perpendicular to the top face thereof and still could be indexed about the axis of symmetry thereof to present new cutting edges successively to cutting position.

Figure 5:
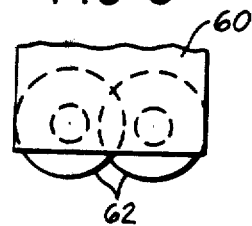
FIG. 5 is a schematic plan view showing how the cutting inserts could be staggered laterally in the cutter body thereby to inhibit the formation of an irregular surface on the tire when the tread material is cut therefrom.

Inasmuch as tread material is somewhat resilient, there will be some tendency for the surface on the tire after the tread material has been cut off to be slightly irregular. This irregularity can be substantially reduced by using cutting elements having cutting edges parallel to the axis of rotation of the cutter body or by making the cutter as indicated in FIG. 5 wherein reference numeral 60 schematically illustrates the cutter body and shows how round button type cutting elements 62 could be mounted thereon in staggered relation thereby tending to eliminate the forming of objectionably large ridges on the surface of the tire being cut.

In any case, the surface of the tire after having been cut off by a cutter according to the present invention can be buffed and portions of the side wall of the tire adjacent the tread can also be buffed and thereby smooth the surface of the tire so that it is in ideal condition for receiving the retread material.

It has been discovered, however, that the clean smooth tread surface which is left after a chip has been taken therefrom by a cutter according to the present invention, forms an ideal surface for receiving recapping material and bonds to the recapping material more strongly than does a conventional buffed surface which is obtained when a rasp is employed to remove a tread.

Due to the sharp edges on the cutting elements, the tread material is removed from the tire in the form of chips of substantial size and the cutting action is clean so that there is not much friction whereby a minimum amount of heat is developed and smoke and vapors are not generated during the cutting operation.

Furthermore, the material removed from the tire tread, as mentioned, is in the form of chips of substantial size and there is little or no dust developed so that no dust collector need be employed when practicing the present invention. Also, since the chips are of substantial size, the fire hazard that would exist if fine dust were to be developed is eliminated as is also the health hazards that go with having the air laden with fine dust.

As an example of the speed of operation, a vehicle tire might be arranged to rotate at a surface speed of about 100 up to more than 1,000 feet per minute while the cutter might rotate at a peripheral speed of about 1,000 up to 10,000 feet per minute with the tire surface and the cutter surface moving in respectively opposite directions.

The removal of the tread material from a conventional passenger vehicle tire takes about 35 seconds when practicing the present invention, which is less than the length of time required to remove the tread material by conventional methods using an abrasive tool which can take one minute or more.

In locating the cutting elements or inserts on the rotatable cutter body and in correlating the speed of the tire being worked with the speed of rotation of the cutter body, it has been found that the best results are obtained when each cutting element on the cutter body removes a chip of substantial size from the tire tread. When the sharp edged cutting elements take substantial chips from the tire tread, cleaner cutting results than is possible when a cutting element takes only a light cut.

The tread material is inherently yieldable and, unless each cutting element encounters a substantial body of rubber and takes a chip of substantial size from the tire tread, there is a tendency for the tread to yield and to tear rather than to cut cleanly. Accordingly, it will be understood that, in the practice of the present invention, each cutting element is intended to remove a clean chip of substantial size from the tread material.

Normally, a single pass across a tire tread is ample for removing the desired amount of tread material and, with each cutting element taking a clean chip with a clean cut from the tread material, the end result is a surface ideally adapted for bonding to recapping material.

Tests and experiments have shown that the bonding of the recapping material to the tread material of a tire which has been cut with a cutter device according to the present invention is as strong and up to 50 percent stronger, for example, than the strength of the bond which exists between retreading or recapping material and a tread surface which has been prepared by buffing with a rasp or the like.

It is also important for the clearance angle behind each cutting edge to be at least equal to and, preferably, slightly greater than the positive rake angle on the front side of each cutting insert because this assists in making a clean cut and prevents the cutting inserts from rubbing on the tread material and developing heat therein. A tire from which the tread has been removed by the use of a cutting device according to the present invention exhibits substantially no rise in temperature during the cutting operation and, similarly, the cutting elements also remain cool during the cutting operation.

It will be noted that the cutter body has a wedge shape in cross section at the periphery and this is done to provide support for the cutting element or insert on the rearward side as near as possible to the radially outer extremity thereof. It will also be noted that the wedge in front of each insert is arcuately recessed across the radially outer end to provide guidance and clearance for the large chips taken by the inserts.

In order to insure the taking of cleanly cut chips of substantial size from the tire tread, the cutting elements, or inserts, are spaced in the direction of movement thereof a substantial distance, for example, a distance of about four inches between each insert, and the nest following insert has been found to be sufficient to cause each insert to encounter a substantial body of tread material when moving past the tire tread and, therefore, to cause each insert to take a cleanly cut chip of substantial size from the tread of the tire.

The cutter body and the tire are shown as rotating on parallel axes, but it is possible for the axes of the tire and the cutter body to be perpendicular to each other. In either case, the cutter body traverses the tire tread during cutting and follows an arcuate path across the crown of the tire and moves radially inwardly at each side of the tire tread for a distance sufficient to prepare the tire to receive the recapping material.

Modifications may be made within the scope of the appended claims.

What is claimed is:

1. The method of removing the tread material from a pneumatic tire preparatory to recapping thereof which comprises; inflating the tire, rotating the inflated tire on the axis thereof, mounting hard wear resistant circular cutting elements in circumferentially spaced and axially coplanar relation in a holder with each insert having a sharp peripheral edge protruding radially from the holder, presenting the holder to the tread of the tire with the axis of the holder parallel to the axis of the tire and with the inserts at a positive rake angle of at least about 25°, moving the holder with the inserts therein relatively to the tire, and feeding the holder and tire relatively in the radial and axial directions of the tire to cause each insert to take cleanly cut chips of substantial size from the tire tread whereby the said inserts form a plurality of circumferentially and axially distributed shallow grooves in the tire tread.

2. The method according to claim 1 in which said chips are of substantial thickness.

3. The method according to claim 1 in which said holder rotates at a surface speed of about 10,000 feet per minute and said tire rotates at a surface speed of about 1,000 feet per minute.

4. The method according to claim 3 in which the inserts are spaced in the direction of movement thereof a distance such that each insert engages a substantial body of tread material each time the insert moves past the tire tread.

5. The method according to claim 4 in which said distance between each insert and the next following insert is on the order of about 4 inches.

* * * * *